United States Patent
Westhues et al.

(10) Patent No.: US 10,444,873 B2
(45) Date of Patent: Oct. 15, 2019

(54) ACTIVE STYLUS SYNCHRONIZATION

(71) Applicant: Microsoft Technology Licensing, LLC, Redmond, WA (US)

(72) Inventors: Jonathan Westhues, Portland, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/616,867

(22) Filed: Jun. 7, 2017

(65) Prior Publication Data
US 2018/0129302 A1    May 10, 2018

Related U.S. Application Data

(60) Provisional application No. 62/418,043, filed on Nov. 4, 2016.

(51) Int. Cl.
*G06F 3/03* (2006.01)
*G06F 3/044* (2006.01)
(Continued)

(52) U.S. Cl.
CPC ............ *G06F 3/038* (2013.01); *G06F 1/3206* (2013.01); *G06F 1/3278* (2013.01);
(Continued)

(58) Field of Classification Search
CPC ...... G06F 3/033; G06F 3/0334; G06F 3/0338; G06F 3/046; G06F 3/03545; G06F 2003/04105; G06F 3/044; G06F 3/038
See application file for complete search history.

(56) References Cited

U.S. PATENT DOCUMENTS 4,560,830 A    12/1985    Perl
7,812,827 B2    10/2010    Hotelling et al.
(Continued)

FOREIGN PATENT DOCUMENTS

EP    3029556 A1    6/2016

OTHER PUBLICATIONS

"International Search Report and Written opinion issued in PCT Application No. PCT/US2017/058921", dated Mar. 2, 2018, 13 Pages.
(Continued)

*Primary Examiner* — William Lu
(74) *Attorney, Agent, or Firm* — Alleman Hall Creasman & Tuttle LLP

(57) ABSTRACT

Examples are disclosed herein that relate to communication between a capacitive touch sensor and an active stylus. An example provides an active stylus comprising an electrode tip, and receive circuitry coupled to the electrode tip. The receive circuitry may be configured to receive a capacitive signal from a touch sensor through the electrode tip, determine which of two or more drive signals produced by respective regions of the touch sensor most strongly influenced the capacitive signal, each drive signal being associated with a different operating mode, and configure one or both of the active stylus and the touch sensor to operate in the operating mode associated with the determined drive signal.

19 Claims, 7 Drawing Sheets

(51) Int. Cl.
*G06F 3/0354* (2013.01)
*G06F 3/038* (2013.01)
*G06F 3/041* (2006.01)
*G06F 1/3206* (2019.01)
*G06F 1/3234* (2019.01)

(52) U.S. Cl.
CPC .......... *G06F 3/03545* (2013.01); *G06F 3/044* (2013.01); *G06F 3/0416* (2013.01); *Y02D 10/157* (2018.01)

(56) References Cited

U.S. PATENT DOCUMENTS

| | | | |
|---|---|---|---|
| 8,493,351 B2 | 7/2013 | Peng et al. | |
| 8,493,359 B2* | 7/2013 | Wright | G06F 3/03545 178/18.06 |
| 8,754,867 B2 | 6/2014 | Krah et al. | |
| 8,976,124 B1 | 3/2015 | Wright | |
| 9,035,911 B2 | 5/2015 | Geaghan | |
| 9,041,678 B2 | 5/2015 | Sugita et al. | |
| 9,158,393 B2* | 10/2015 | Vlasov | G06F 3/044 |
| 9,323,368 B2 | 4/2016 | Zachut | |
| 9,448,645 B2 | 9/2016 | Geaghan | |
| 9,448,670 B2* | 9/2016 | Walley | G06F 3/0416 |
| 9,471,159 B2 | 10/2016 | Varlamov et al. | |
| 9,696,861 B2* | 7/2017 | Dinu | G06F 3/044 |
| 9,939,975 B2* | 4/2018 | Ye | G06F 3/0416 |
| 2010/0252335 A1* | 10/2010 | Orsley | G06F 3/044 178/18.03 |
| 2012/0050207 A1* | 3/2012 | Westhues | G06F 3/03545 345/174 |
| 2014/0049478 A1* | 2/2014 | Brunet | G06F 3/0416 345/173 |
| 2014/0111464 A1 | 4/2014 | Bakken et al. | |
| 2014/0267070 A1* | 9/2014 | Shahparnia | G06F 3/046 345/173 |
| 2016/0048234 A1* | 2/2016 | Chandran | G06F 3/044 345/174 |
| 2016/0209940 A1 | 7/2016 | Geller et al. | |
| 2016/0209944 A1* | 7/2016 | Shim | G06F 3/03545 |
| 2017/0090658 A1* | 3/2017 | Park | G06F 3/0416 |

OTHER PUBLICATIONS

Hughes, Andrew, "Active Pen Input And The Android Input Framework", In Master's Thesis of California Polytechnic State University, Jun. 2011, 64 pages.

* cited by examiner

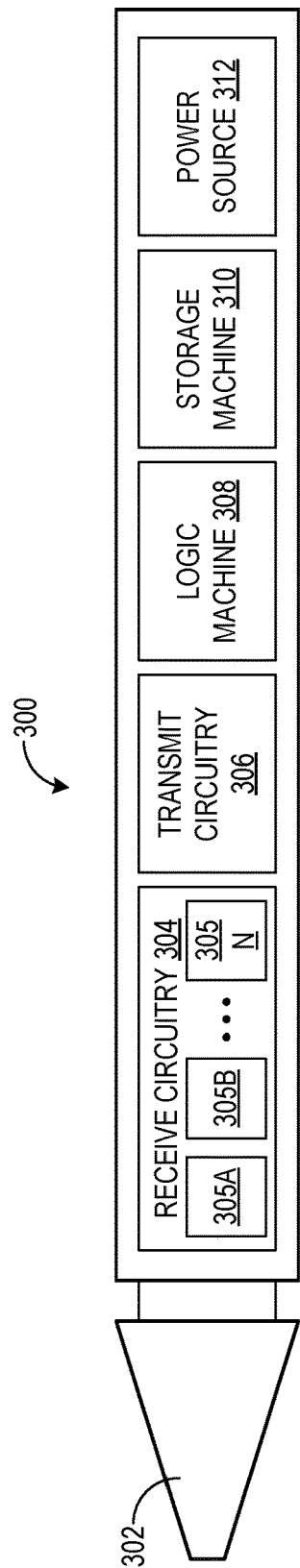

ACTIVE STYLUS SYNCHRONIZATION

CROSS REFERENCE TO RELATED APPLICATIONS

This application claims priority to U.S. Provisional Patent Application No. 62/418,043, filed Nov. 4, 2016, the entirety of which is hereby incorporated herein by reference.

BACKGROUND

In some interactive touch-sensing systems, communication occurs between a touch sensor and a stylus. For example, the touch sensor and stylus may capacitively couple so that input applied by the stylus is received at the touch sensor. The stylus may attempt to synchronize operation with the touch sensor as part of the capacitive coupling.

BRIEF DESCRIPTION OF THE DRAWINGS

FIG. 3 shows an example active stylus.

DETAILED DESCRIPTION

Figure 1:
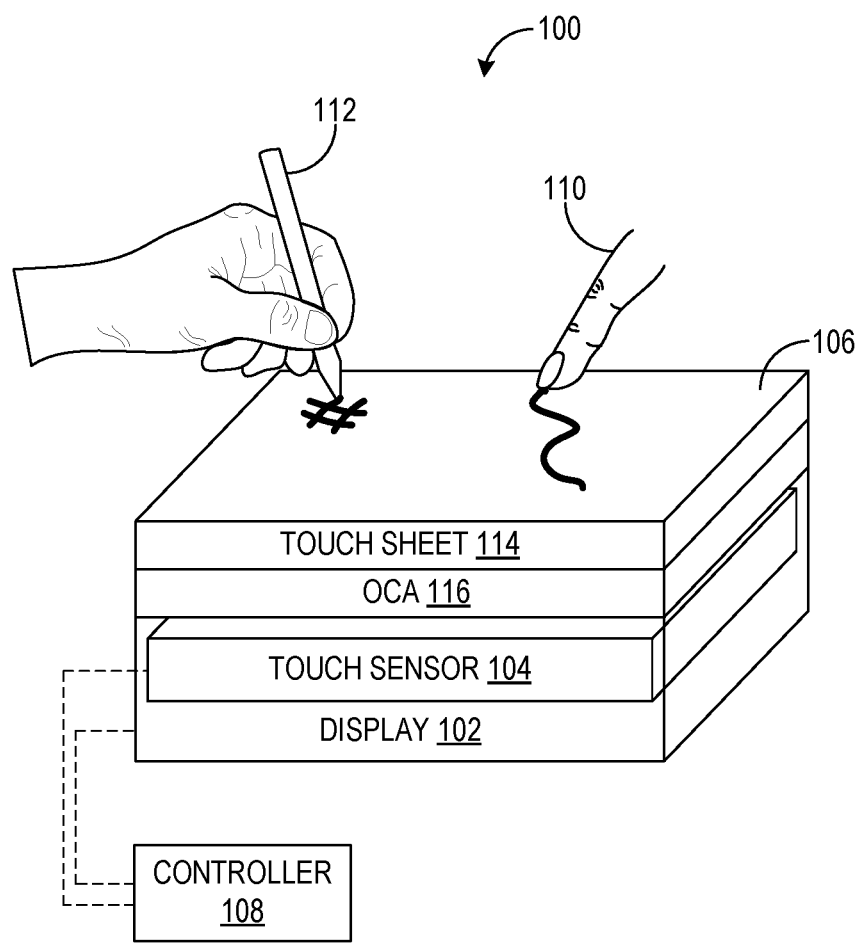
FIG. 1 shows an example touch-sensitive display system.

In some interactive touch-sensing systems, communication occurs between a touch sensor and a stylus. For example, the touch sensor and stylus may capacitively couple so that input applied by the stylus is received at the touch sensor and/or so that the stylus can receive transmissions from the touch sensor. The stylus may attempt to synchronize operation with the touch sensor as part of the capacitive coupling, by acquiring knowledge of its relative position and/or the timing of touch sensor operation.

In a typical implementation, a touch sensor transmits signals that, when received by an active stylus, enable the stylus to temporally synchronize with the touch sensor. For example, the signals may indicate the temporal position in a touch scanning sequence at which the touch sensor is operating. Among other things, synchronization may enable the stylus to know when certain signal transmissions are permitted, as the touch sensor may be configured to receive such transmissions only during certain operating periods. For some touch sensor configurations, the signals transmitted by the touch sensor may also apprise the stylus of its location relative to the touch sensor. For example, the stylus may determine its location relative to a capacitive touch sensor that performs sequential electrode driving by correlating (1) the time at which the strongest signal was received in a touch frame with (2) the temporal position in the touch frame at which a corresponding electrode or set of electrodes was driven.

For other touch sensor configurations, knowledge of the temporal position of a touch sensor may be insufficient to achieve synchronization and communication with an active stylus. In one example configuration, a touch sensor is sequentially scanned via receive circuitry that is successively multiplexed to different electrode regions at respective time slots within a touch frame. To receive stylus input with sufficient signal integrity, it is desirable that stylus transmission occur while the electrode region corresponding to the stylus location (e.g., the region under the stylus) is multiplexed to the receive circuitry.

In one approach, to achieve this, the stylus electrode is driven during each time period in which the receive circuitry could be multiplexed to the relevant region of the touch sensor. In another approach, the stylus electrode is driven only when the receive circuitry is known to be multiplexed. This latter mode of communication is dependent on stylus knowledge of the timing of touch sensor operation—specifically, identifying the specific time at which the under-stylus region will be multiplexed to the receive circuitry. In some configurations, however, the touch sensor may drive all electrodes at substantially the same time with similar or identical excitation signals. This may render the correlation-based approach in the sequentially-driven example described above ineffective for determining stylus location, as the touch sensor appears spatially undifferentiated to the stylus. Without sufficient knowledge of its location over the touch sensor, the stylus may thus need to transmit signal from its tip electrode over most/all of the touch frame slots to ensure transmission, as mentioned above. In some settings, this would entail higher consumption of power at the stylus than if stylus position were known.

Accordingly, implementations are disclosed herein for enabling an active stylus to spatially differentiate different regions of a touch sensor. To this end, different regions of the touch sensor may produce respective drive signals. The stylus may receive a capacitive signal induced by one or more of the drive signals, and may determine which of the drive signals most strongly influenced the capacitive signal. Each drive signal may be associated with a different operating mode according to which the stylus and/or touch sensor can operate. Among other potential operations, an operating mode may include stylus transmission while an electrode region proximate to the stylus is multiplexed to receive circuitry of the touch sensor, while not engaging in such transmissions at other times, as described in further detail below.

FIG. 1 shows an example touch-sensitive display system 100 that may employ differing drive signals to facilitate stylus interaction. Display system 100 includes a display 102 and a capacitive touch sensor 104 to enable graphical output and input sensing. Display 102 may selectively emit light in an upward direction to yield viewable imagery at a top surface 106 of the display device or other locations. Display 102 may assume the form of a liquid crystal display (LCD), organic light-emitting diode display (OLED), or any other suitable display.

Touch sensor 104 may receive input in a variety of form(s). As examples, touch sensor 104 and associated componentry may sense touch input from a user's body, such as input applied by a human digit 110 in contact with top surface 106 of display system 100, and/or input from a non-digit input device such as an active stylus 112. As described in further detail below, touch sensor 104 may (1) receive position, tip force/pressure, button state, and/or other stylus state information from stylus 112; and/or (2) transmit information to the stylus. Other forms of input received at touch sensor 104 may include force/pressure, hover input, and/or the height associated with a hovering input mechanism, for example. Further, touch sensor 104 may receive input from multiple input devices (e.g., digits, styluses, other input devices) simultaneously, in which case display system 100 may be referred to as a "multi-touch" display system. To enable input reception, touch sensor 104 may detect changes associated with the capacitance of a plurality of electrodes, as described in further detail below.

Inputs received by touch sensor 104 may affect any suitable aspect of display 102 and/or a computing device operatively coupled to display system 100, and may include two or three-dimensional finger inputs and/or gestures. As an example, FIG. 1 depicts the output of graphical content by display 102 in spatial correspondence with paths traced out by digit 110 and stylus 112 proximate to top surface 106.

A controller 108, coupled to display 102 and touch sensor 104, may effect display operation (e.g., pixel output, drive electronics) and touch sensor operation (e.g., electrode driving and receiving). A suitable image source, which may be integrated with, or provided separately from, controller 108, may provide graphical content for output by display 102. The image source may be a computing device external to, or integrated within, display system 100, for example. While FIG. 1 shows controller 108 as effecting operation of both display 102 and touch sensor 104, separate display and touch sensor controllers may be provided.

Display system 100 may be implemented in a variety of forms. For example, display system 100 may be implemented as a so-called "large-format" display device with a diagonal dimension of approximately 1 meter or greater, or in a mobile device (e.g., tablet, smartphone) with a diagonal dimension on the order of inches. Other suitable forms are contemplated, including but not limited to desktop display monitors, high-definition television screens, tablet devices, etc.

Display system 100 may include other components in addition to display 102 and touch sensor 104. As an example, FIG. 1 shows an optically clear touch sheet 114 providing top surface 106 for receiving touch input as described above. Touch sheet 114 may comprise any suitable materials, such as glass or plastic. Further, an optically clear adhesive (OCA) 116 bonds a bottom surface of touch sheet 114 to a top surface of display 102. As used herein, "optically clear adhesive" refers to a class of adhesives that transmit substantially all (e.g., about 99%) of incident visible light. Display system 100 may include alternative or additional components not shown in FIG. 1, including but not limited to various optical elements (e.g., lens, diffuser, diffractive optical element, waveguide, filter, polarizer).

FIG. 1 depicts the integration of touch sensor 104 within display 102 in a so-called "in-cell" touch sensor implementation. In this example, one or more components of display system 100 may be operated to perform both display output and input sensing functions. As a particular example in which display 102 is an LCD, the same physical electrode structures may be used both for capacitive sensing and for determining the field in the liquid crystal material that rotates polarization to form a displayed image. Alternative or additional components of display system 100 may be employed for display and input sensing functions, however. Further details regarding in-cell implementations are described below with reference to FIG. 2, which shows an example in-cell touch sensor.

Other touch sensor configurations are possible. For example, touch sensor 104 may alternatively be implemented in a so-called "on-cell" configuration, in which the touch sensor is disposed directly on display 102. In an example on-cell configuration, touch sensing electrodes may be arranged on a color filter substrate of display 102. Implementations in which touch sensor 104 is configured neither as an in-cell nor on-cell sensor are possible, however. In such implementations, an optically clear adhesive (OCA) may be interposed between display 102 and touch sensor 104, for example.

Figure 2:
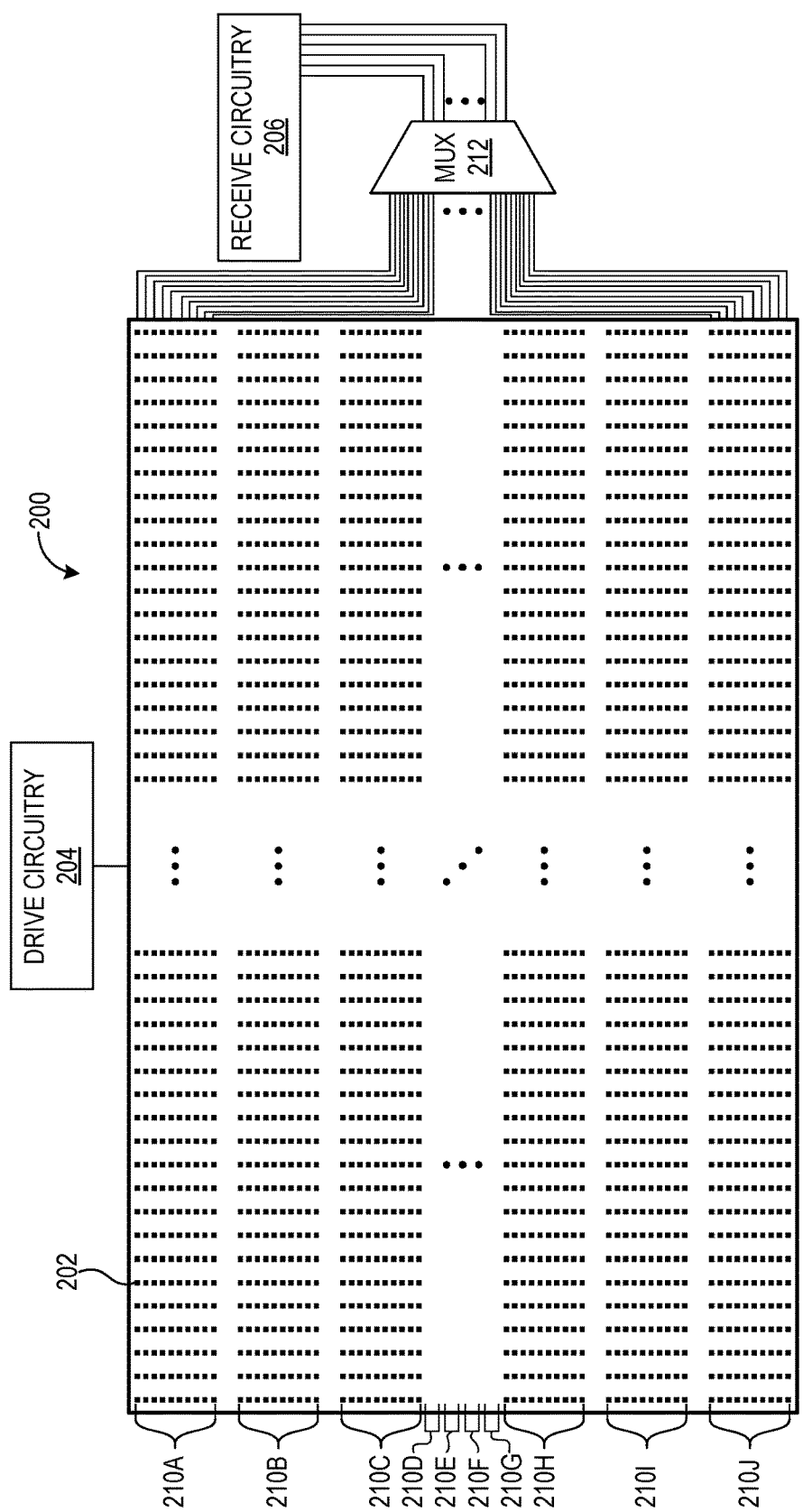
FIG. 2 shows an example touch sensor.

FIG. 2 shows an example in-cell touch sensor 200 that may employ differing drive signals to facilitate stylus interaction. Touch sensor 200 includes a plurality of electrodes (e.g., electrode 202), each of which are configured to detect touch and/or other inputs by receiving current. The plurality of electrodes is referred to herein as a plurality of "sensels", for example with reference to in-cell and on-cell implementations. To enable sensel charging and the reception of resulting output, the sensels are operatively coupled to drive circuitry 204 and receive circuitry 206. Via drive circuitry 204, each sensel may be selectively driven with a drive signal. Via receive circuitry 206, charge induced by such driving, and potentially influenced by other conditions (e.g., finger inputs), is analyzed to perform input sensing. A drive signal (also referred to herein as an "excitation sequence") may take the form of a time-varying voltage that, when digitally sampled, includes a sequence of pulses. The sequence of pulses may include binary values (e.g., 0 or 1, 1 or −1), or three or more values in other implementations. Touch sensor 200 thus represents a self-capacitance approach to touch sensing, in which the electrical properties of a sensel itself are measured, rather than in relation to another electrode in the touch sensor.

Due to the relatively large number of sensels included in a typical implementation of touch sensor 200, a limited number of sensels are shown in FIG. 2 for simplicity/clarity. Examples described below contemplate a particular configuration in which touch sensor 200 includes 20,000 sensels—e.g., when implemented in a large-format display device. Touch sensor 200 may include any suitable number of sensels, however.

In an example such as that referenced above with 20,000 sensels, the sensels may be arranged in 100 rows and 200 columns. While it may be desirable to maximize sensing frequency by simultaneously measuring capacitance at each sensel, this would entail provision of significant processing and hardware resources. In particular, 20,000 receivers in receive circuitry 206 would be needed to perform full-granularity, simultaneous self-capacitance measurements at each sensel. As such, partial-granularity, multiplexed approaches to self-capacitance measurement may be desired to reduce the volume of receive circuitry 206. Specifically, as described below, receive circuitry capable of servicing only a portion of the touch sensor at one time may be successively connected to different portions of the touch sensor over the course of a touch frame, via time multiplexing, in order to service the entirety of touch sensor 200. A complete scan of all sensels in touch sensor 200—e.g., the eventual connection of receive circuitry to all portions of the touch sensor—may be referred to herein as a "touch frame", though in other examples a touch frame may refer to driving a subset of the sensels and/or receiving at a subset of the sensels, or to multiple scans of a given set of sensels.

FIG. 2 illustrates one example approach to partial-granularity self-capacitance measurement in touch sensor 200. In this approach, the sensels are grouped into horizontal bands 210A-210J, each having ten rows of sensels. Self-capacitance measurements are temporally multiplexed via a multiplexer 212, with a respective measurement time slot in a touch frame being allocated for each band 210. Accordingly, receive circuitry 206 may include a number of receivers equal to the number of sensels in a given band 210—e.g., 2,000 receivers. For example, the receivers may be connected to one band in a first time slot, then to another in the next time slot, and so on. It will be appreciated that the above groupings, bands, number of sensels, etc. reflect but one of many possible implementations. Different numbers of sensels may be employed; shapes and arrangements of groupings may differ from the depicted example; etc. Further, similar multiplexing may be applied in driving the plurality of sensels, such that the sensels are arranged in subsets which are each driven in a corresponding time slot of a touch frame.

The receivers of receive circuitry 206 may carry out a correlation-based approach to input sensing. In such an approach, each receiver may include an analog-to-digital converter (ADC) for sampling current, and correlation circuitry for correlating (e.g., via the cross-correlation function) sampled current with a reference sequence, yielding an output reflective of the current. The output may be a number that is compared to a threshold to determine whether an input mechanism is proximate to touch sensor 200, for example. In some examples, a drive signal used to drive sensels may form the basis for a reference sequence. Further, one or more reference sequences may be designed to mitigate noise for certain operating conditions, noise sources, and/or wavelength bands.

In some implementations, touch sensor 200 may selectively operate in a "full search" mode and a "local search" mode. Full search refers to operations, within the course of a single touch frame, that cause the entirety of touch sensor 200 to be scanned for inputs. Local search refers to performing an operation for only a portion of touch sensor 200 in a touch frame. The full search may identify a location of an input mechanism (e.g., human digit, active stylus). For example, with reference to the multiplexing scheme described above, the full search may identify one of the bands 210 in which the input mechanism resides (and/or an x/y location of the input mechanism). For some types of input mechanisms, identification of this band may prompt further processing in the form of a local search in the band.

For an active stylus, touch sensor 200 may use at least a portion of a local search to listen for transmissions from the stylus, such as transmissions regarding stylus state information (e.g., firmware version, battery level, button state, tip force/pressure, identification information). By limiting operations to a region (e.g., band 210) corresponding to the stylus location, touch sensor 200 may reduce the processing resources, power and time needed to support interaction with the stylus. In some examples, touch sensor 200 may receive stylus transmissions in multiple local searches within a touch frame in the band 210 identified by a full search, to thereby increase a stylus scan/communication rate and reduce stylus interaction latency.

While the identification of a band 210 having stylus presence via a single full search may prompt local searching in that band, in other implementations local searching may occur after full searches are conducted in multiple bands, or in every band, such that the results of full searching across larger portions or the entirety of touch sensor 200 are considered before searching locally. Alternatively or in addition to receiving stylus transmissions, touch sensor 200 may perform a local search to update the location of an input mechanism relative to its previously determined location in a prior full search, as the input mechanism may move between full and local searches. Still further, for examples in which full searching reveals a coarse or less accurate location of an input mechanism, local searching may refine the coarse location determined via full searching.

In some implementations, touch sensor 200 may apply multiple drive signals to the sensels during full searching, local searching, and/or other operating modes. As will be described in detail below, such an approach can enable a stylus to learn its position, improve power efficiency of the stylus, facilitate touch sensor-stylus synchronization, and increase time efficiency of touch frame operations, among other advantages. In one example approach, touch sensor 200 may apply a different drive signal to each band 210. The division of touch sensor 200 into different bands of operation by the application of band-specific drive signals is but one example of arranging the touch sensor into different regions of operation with associated drive signals. For example, other arrangements may include other numbers of bands; other rectangular geometries (including partial bands); non-rectangular geometries; irregular geometries; non-Euclidean geometries; and/or portions, and not the entirety, of touch sensor 200.

In addition to the use of per-band drive signals, touch sensor 200 may sequentially interrupt the driving of each band 210 with its respective drive signal and apply a sensing drive signal to detect the presence of proximate input mechanism(s). For example, application of the drive signal may reveal the presence and/or location (e.g., in the form of an x/y coordinate of the digit relative to touch sensor 200) of a proximate human digit by inducing sensel current/charge that is reduced at the digit location relative to other locations. The drive signal may also reveal the presence and/or location of a proximate active stylus by inducing sensel current/charge that is influenced in the area of the stylus by a stylus drive signal transmitted by the stylus to touch sensor 200, as described below. As also described below, the sensing drive signal may enable the stylus to gain knowledge of the timing of a touch frame, such as when a particular band 210 is being scanned, and thus synchronize with touch sensor 200. In view of the above, "synchronization" as used herein may refer to temporal synchronization (e.g., involving knowledge of touch frame timing) of an active stylus with a touch sensor, and/or to spatial synchronization (e.g., involving knowledge of relative stylus position) of the active stylus and the touch sensor.

The temporal and spatial synchronization of an active stylus with touch sensor 200 may affect how the stylus and/or touch sensor operate. As described in further detail below, the stylus may employ synchronization to (1) determine which band 210 it is proximate to, (2) ascertain when the proximate band is multiplexed to receive circuitry 206, and (3) constrain transmissions to the touch frame time slot(s) in which that band is scanned. For example, the stylus may constrain transmission to the full search of the band 210, which in turn may affect operation of touch sensor 200 by causing a local search in the band 210 for receiving additional stylus transmissions. In particular, the stylus may transmit a stylus drive signal that indicates its x/y location to touch sensor 200 in the full search, and may transmit stylus state information described below in the local search. In some examples, the stylus drive signal may be configured similarly to the sensing drive signal in a manner that both can be used to identify and/or locate the presence of an input mechanism, but induce outputs of substantially opposite polarity—e.g., output induced by the influence of the stylus drive signal on the sensing drive signal may be of substantially opposite polarity to output induced by the influence of a human finger on the sensing drive signal. Additional detail regarding touch sensor and stylus operation in various modes associated with different drive signals is described below with reference to FIGS. 4A-4B.

FIG. 3 shows an example active stylus 300 that may adapt operation according to different drive signals applied by a touch sensor such as touch sensor 200. Stylus 300 includes an electrode tip 302 through which capacitive signals may be transmitted and/or received, for example in the form of electrostatic fields. Receive circuitry 304, coupled to electrode tip 302, may receive and correlate capacitive signals with one or more reference sequences to synchronize with the touch sensor, receive touch sensor communications, and/or perform other operations. Each reference sequence may be designed based on a corresponding drive signal employed by the touch sensor, such that, for touch sensor configurations that use multiple drive signals, receive circuitry 304 may include a respective reference sequence for each drive signal. To this end, FIG. 3 shows the inclusion of N receivers 305A-N each configured to perform correlations using a respective reference sequence designed for a corresponding drive signal. When configured for interaction with touch sensor 200, for example, receive circuitry 304 may include eleven receivers: ten receivers each with a respective reference sequence designed for a corresponding band 210 in which a band-specific drive signal is used, and an eleventh receiver with a reference sequence designed for the sensing drive signal. As described in further detail below with reference to FIGS. 4A-4B, receive circuitry 304 may selectively activate and/or deactivate one or more receivers 305 based on touch sensor drive signal(s) whose reception are anticipated.

Stylus 300 further includes transmit circuitry 306 for transmitting capacitive signals. In particular, transmit circuitry 306 may cause the application of a drive signal (e.g., the stylus drive signal described above) to electrode tip 302, which may induce a capacitive signal at a proximate touch sensor. A logic machine 308 executes instructions held by a storage machine 310 to effect the approaches described herein. For example, logic machine 308 may execute instructions to maintain temporal and/or spatial synchronization with a touch sensor, and to selectively transmit signals to the touch sensor. A power source 312, such as a battery, provides power to the components of stylus 300. Stylus 300 may include alternative or additional components not shown in FIG. 3, including but not limited to one or more buttons, an electrode end, one or more electrodes arranged in the stylus body, and a force sensor for determining force associated with deflection of electrode tip 302.

Figure 4A:
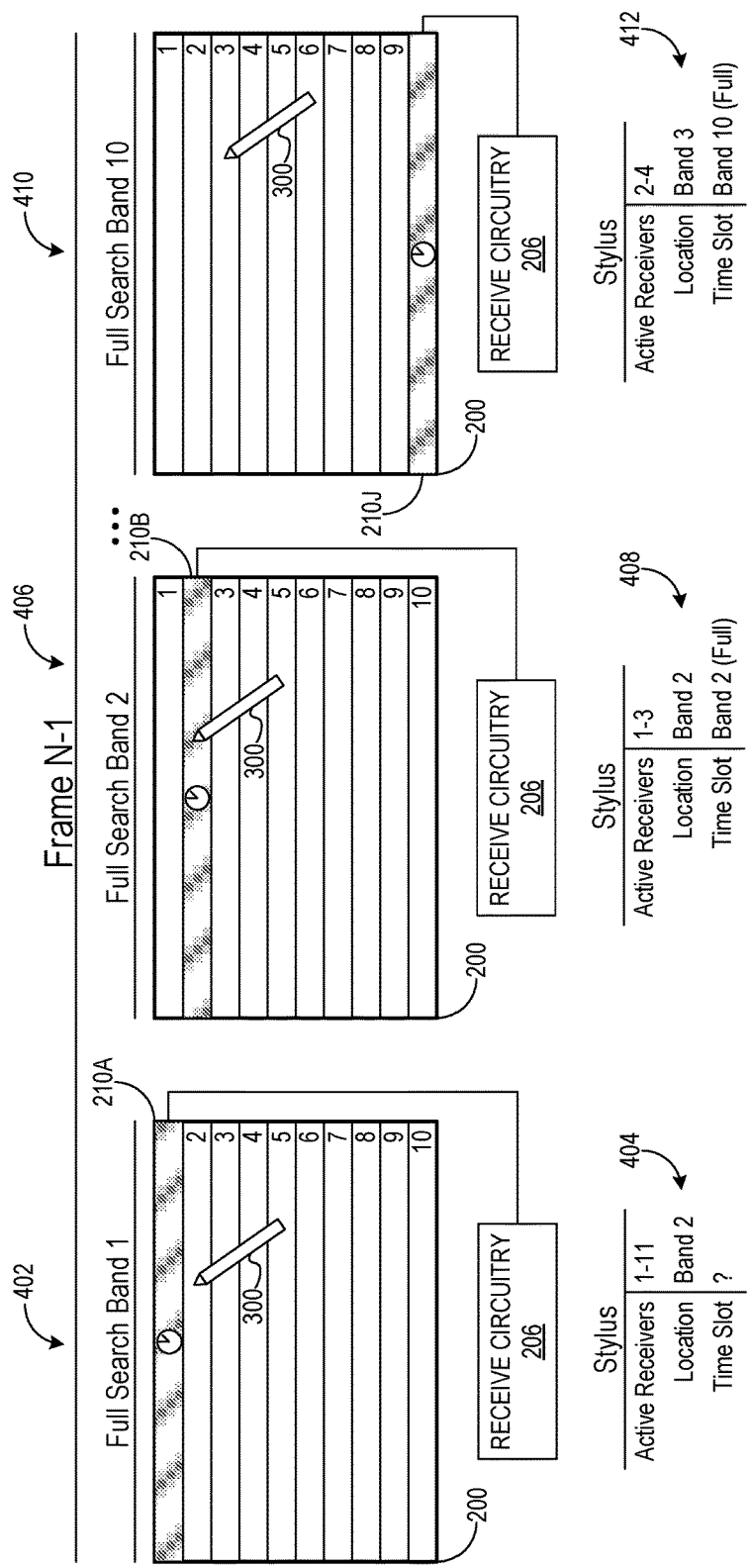
FIGS. 4A-4B depicts an example scenario showing the operating modes of the touch sensor of FIG. 2 and the active stylus of FIG. 3 in successive touch frames.
Figure 4B:
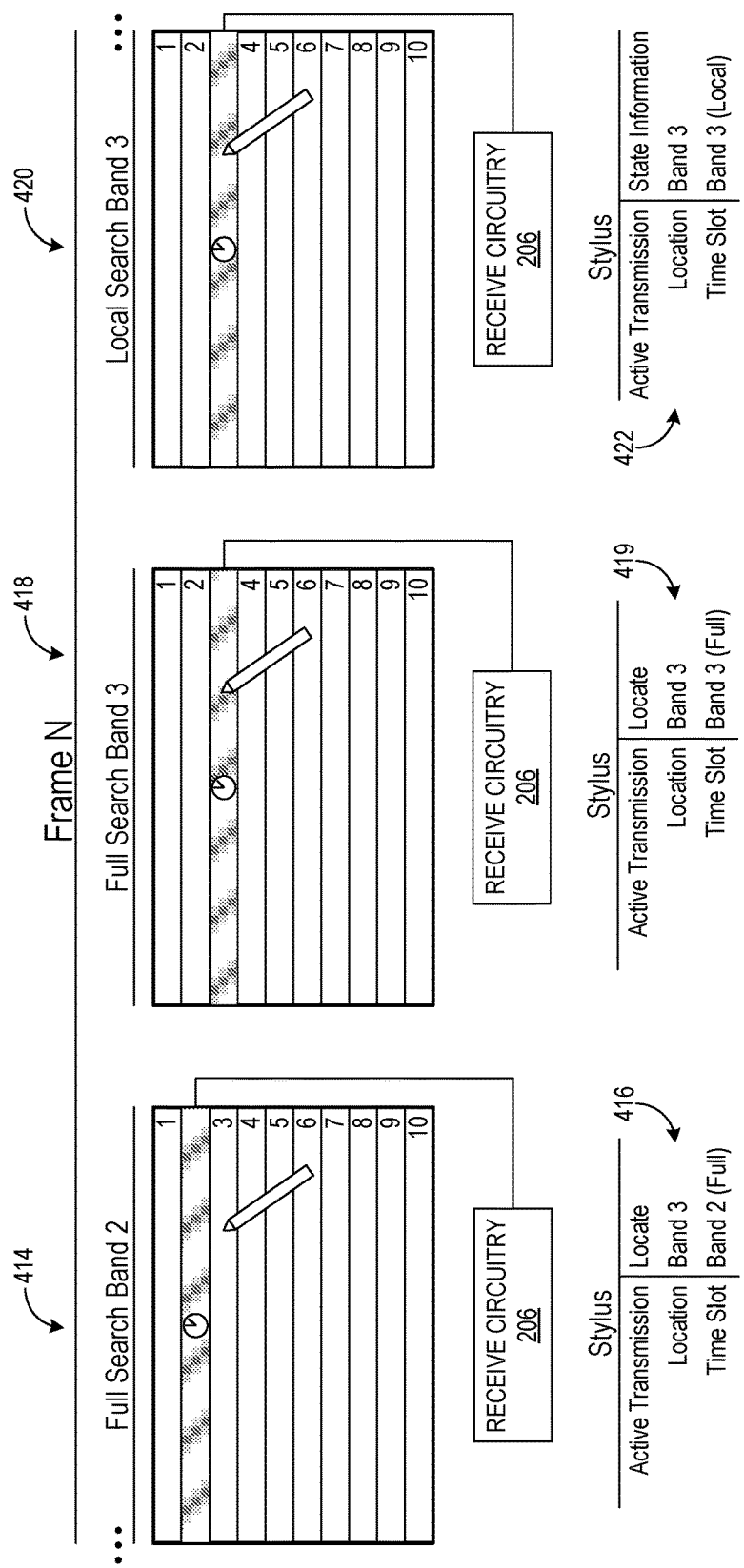

To illustrate the potential operation of a touch sensor and/or active stylus as a function of touch sensor drive signals, FIGS. 4A-4B depicts an example scenario showing the operating modes of touch sensor 200 and active stylus 300 in successive touch frames. The example depicted in FIGS. 4A-4B may apply to other touch sensors and/or styluses, however, as described in further detail below.

FIG. 4A illustrates touch sensor and active stylus operation in a touch frame N−1. Touch frame N−1 may be the N−1th frame of a sequence of M touch frames, for example. As indicated at 402, a first full search is conducted at the first band (e.g., band 210A) of touch sensor 200 by applying the sensing drive signal described above to the first band, and multiplexing the first band to receive circuitry 206 to thereby receive output induced (e.g., primarily) by the sensing drive signal and finger/stylus, when present. In contrast, bands 2-10 are respectively driven with band-specific drive signals during the first full search.

During the first full search, stylus 300 receives a capacitive signal from touch sensor 200. Since multiple drive signals e.g., the sensing drive signal, the band-specific drive signal in the second band, the band-specific drive signal in the third band may influence the capacitive signal, stylus 300 determines which of the drive signals produced by respective bands 210 most strongly influenced the capacitive signal. This may include correlating the capacitive signal using eleven receivers 305 (ten respectively configured for the band-specific drive signals, and an eleventh receiver configured for the sensing drive signal), and identifying the receiver that produced the highest correlation, for example. As stylus 300 is positioned most closely to the second band, the second band-specific drive signal is determined as the strongest influence on the capacitive signal. In response, stylus 300 identifies the second band of touch sensor 200 as corresponding to the general location of the stylus relative to the touch sensor. In this way, stylus 300 becomes spatially synchronized with, and apprised of its relative location to, touch sensor 200. As explained in more detail below, one exemplary use of spatial synchronization involves associating an operating mode with each band-specific drive signal, with the respective operating mode being activated in response to stylus 300 detecting the drive signal. Operation of stylus 300 may thus vary based on its position relative to the touch sensor.

As indicated at 404, the state of stylus 300 during the first full search includes: (1) actively operating eleven receivers 305 to determine which drive signal(s) influenced the capacitive signal, as, without prior knowledge of relative location or touch sensor timing, the influencing drive signal(s) are unknown; (2) after correlating the capacitive signal with the eleven receivers, acquiring knowledge of its proximity to the second band of touch sensor 200; and (3) lacking, absent prior temporal synchronization, knowledge of which band is currently being scanned. In some examples, stylus 300 may not receive the sensing drive signal with sufficient signal-to-noise ratio (SNR) when over a band adjacent to that being driven with the sensing drive signal. In other examples, stylus 300 may receive the sensing drive signal with sufficient SNR when in a neighboring band but, lacking certainty as to the direction from which it originates, may postpone positive identification of the drive signal until it is received in the band occupied by the stylus. To this end, stylus 300 may compare a received sensing drive signal to a threshold SNR to determine whether the drive signal is in the band occupied by the stylus or another band.

As indicated at 406, a second full search is conducted in the second band (e.g., band 210) of touch sensor 200 following the first full search. The second full search includes driving the second band with the sensing drive signal, and multiplexing receive circuitry 206 to the second band to thereby receive output associated with the sensing drive signal. In contrast, bands 1 and 3-10 are respectively driven with band-specific drive signals. Between the first and second full searches, FIG. 4A illustrates a potential approach in which touch sensor 200 successively drives each band with the sensing drive signal, such that the particular band to which the sensing drive signal is applied is incremented with each time slot (1 to 2, 2 to 3, etc.). In this approach, the sensing drive signal interrupts driving with a band-specific drive signal for a particular band; for the second band, application of the sensing drive signal interrupts application of its band-specific drive signal in the second full search. When implemented such that all bands are scanned with the sensing drive signal in a single touch frame, stylus 300 can be apprised of touch frame timing after no more than the duration of a single touch frame.

During the second full search, stylus 300 receives a capacitive signal primarily influenced by the sensing drive signal, which causes an associated operating mode of the stylus. In this operating mode, stylus 300 identifies the current time slot of touch frame N−1 at which touch sensor 200 is operating based on the sensing drive signal. Thus, as indicated at 408, the state of stylus 300 in the second full search (after identifying the current time slot) includes knowledge of the time slot of touch sensor 200 in touch frame N−1—e.g., knowledge that the second band is being scanned during the second full search.

In addition to achieving temporal synchronization with touch sensor 200 in touch frame N−1, stylus 300 may maintain the temporal synchronization in subsequent frames using the sensing drive signal detected in frame N−1. Via logic machine 308, stylus 300 may perform calculations that increment its sense of touch frame timing using the sensing drive signal detected in frame N−1. Specifically, this sensing drive signal may be used to increment timing in touch frame N−1 for time slots subsequent to the slot in which the drive signal was detected, and/or to increment timing in subsequent frames. In this way, stylus 300 can maintain temporal synchronization with touch sensor 200 across a plurality of frames with just a single detection of the sensing drive signal. Various conditions may prompt re-detection of the sensing drive signal and re-synchronization, however, such as stylus 300 departing from communicative (e.g., electrostatic) range with touch sensor 200, the stylus powering down (e.g., in response to inactivity), user input, etc.

Stylus 300 may use one or more band-specific drive signals to maintain temporal synchronization with touch sensor 200. For example, stylus 300 may detect a characteristic regarding the driving with the band-specific drive signals, such as a positive edge of the capacitive signals received through electrode tip 302 that result from each pulse of the drive signals. In some configurations, each positive edge/pulse may occur with each time slot of a touch frame, as the band-specific drive signals are applied every time slot. Thus, the detection of the band-specific drive signals may inform stylus 300 of time slot timing, and thus touch frame timing. This may enable stylus 300 to maintain temporal synchronization in the presence of small errors that might accumulate in its sense of touch frame timing, which may result from the incrementation of time at the stylus (e.g., estimates of touch sensor operation that include error) and/or operation of touch sensor 200 (e.g., changes in operating mode, mode duration). Other drive signal timings are possible, however, as is the detection of other characteristic(s) (e.g., negative edges) of the drive signals that inform stylus 300 of touch frame timing.

In other examples, stylus 300 may use aspects of signal correlation itself to maintain temporal synchronization with touch sensor 200. For example, stylus 300 may correlate a capacitive signal with a reference sequence, and interpolate the correlation result to find the time at which the correlation result achieved a maximum value. Stylus 300 may then use this time to update its temporal synchronization with touch sensor 200. Such an approach may benefit from increased SNR relative to the edge-based approach described above.

As also indicated at 408, after the second full search stylus 300 deactivates the receivers 305 used to correlate band-specific drive signals from bands 4-10, and the receiver used to correlate the sensing drive signal. In this example, the configuration of touch sensor 200 and stylus 300 is such that the stylus can move no more than one band between adjacent touch frames. Thus, the maximum stylus movement from band 2 in time slot 2 is limited to either band 1 or band 3 in a subsequent time slot 3, meaning that maintaining activation of the receivers 305 corresponding to bands 1-3 is sufficient to maintain spatial synchronization in the subsequent time slot. Similarly, detection of the sensing drive signal in a single time slot of a touch frame may be sufficient to help stylus 300 to gain temporal synchronization, meriting deactivation of the corresponding receiver 305. Implementations are contemplated, however, in which the sensing drive signal receiver 305 is kept active. Further, other numbers of receivers 305 may be kept active depending on the properties of touch sensor 200 and/or stylus 300—for example, the maximum stylus movement between time slots may constrain receiver activation/deactivation based on anticipated band proximity, and vary as a function of touch sensor size, stylus size, touch sensor scan frequency, etc.

FIG. 4A also illustrates touch sensor and stylus operating state in a tenth full search conducted at the tenth band (e.g., band 210J) of touch sensor 200, as indicated at 410. The tenth full search is conducted after full searches conducted in bands 3-9, which are omitted from FIG. 4A for simplicity. In the tenth full search, touch sensor 200 applies the sensing drive signal to the tenth band, and multiplexes receive circuitry 206 to the tenth band to receive resulting output. Further, at some point during time slots 3-9, stylus 300 has moved from the second band to the third band of touch sensor 200, causing a change in operating state.

By detecting the band-specific drive signal from the third band of touch sensor 200, and identifying its strongest influence among various other drive signals, stylus 300 determines its relative proximity to the third band, as indicated at 412. As also indicated at 412, stylus 300 performs selective activation and deactivation of receivers 305 based on band proximity. Due to the limit on maximum stylus movement between time slots described above, the receivers corresponding to bands 2-4 are activated, with the receiver corresponding to band 1 being deactivated upon determining relative proximity to the third band. Finally, by maintaining temporal synchronization with touch sensor 200, the state of stylus 300 includes knowledge of the current time slot corresponding to full searching in the tenth band of the touch sensor.

Turning now to FIG. 4B, a touch frame N subsequent to the touch frame N−1 is shown. Stylus 300 uses knowledge gained in the previous touch frame N−1 to perform selective transmission in the touch frame N to touch sensor 200. As indicated at 414, a second full search, following a first full search omitted from FIG. 4B for simplicity, is conducted in the second band of touch sensor 200. As indicated at 416, the state of stylus 300 includes knowledge of its relative proximity to band 3 of touch sensor 200, via reception of its band-specific drive signal, and knowledge of the time slot corresponding to full searching in band 2 via reception of the sensing drive signal in the previous touch frame N−1. As also indicated at 416, stylus 300 transmits a stylus drive signal that indicates a relative x/y location of the stylus to touch sensor 200 as described above. In this example, stylus 300 transmits signals while touch sensor 200 is multiplexed to a band different than that to which the stylus is proximate. For example, stylus 300 may transmit while bands 2 and 4, neighboring band 3 over which it is currently positioned, are multiplexed. Stylus 300 may transmit to neighboring multiplexed bands so that transmissions are received at touch sensor 200 despite stylus movement. The number of neighboring bands can be selected according to the maximum stylus movement between time slots to ensure reception of stylus transmissions, similar to the selective activation and deactivation of receivers 305 described above.

A third full search, indicated at 418, is conducted in band 3 of touch sensor 200 following the second full search. With band 3 multiplexed to receive circuitry 206, and stylus 300 transmitting while proximate to band 3, the locating signal transmitted by the stylus is received at touch sensor 200, apprising the touch sensor of the relative x/y stylus location. Should stylus 300 actively operate the receiver 305 configured for the sensing drive signal, the stylus receives the sensing drive signal from band 3, with which the stylus may re-synchronize or update its temporal synchronization with touch sensor 200. Thus, as indicated at 419, the state of stylus 300 in the third full search includes: (1) transmission of the locate signal, (2) knowledge of its proximity to the third band, and (3) knowledge of the time slot corresponding to full searching in the third band, known either from the sensing drive signal received in touch frame N−1 or the drive signal received in frame N.

The sensing drive signal causes touch sensor 200 to engage an operating mode in which subsequent stylus transmissions can be received. As indicated at 420, touch sensor 200 conducts a local search in band 3 where the locating signal was received from stylus 300 in the preceding full search in band 3. In the local search, touch sensor 200 listens (e.g., by holding the plurality of sensels at a fixed voltage) for the transmission of stylus state information, which induces corresponding output at the touch sensor that is received via multiplexing of the third band to receive circuitry 206. The stylus state information may include but is not limited to information regarding an identity of stylus 300, a version of firmware installed on the stylus, the state of one or more buttons provided on the stylus (if included), battery level, and the force/pressure associated with the deflection of electrode tip 302. Thus, as indicated at 422, the state of stylus 300 in the local search includes: (1) transmission of the stylus state information, (2) knowledge of its proximity to the third band, and (3) knowledge of the time slot corresponding to local searching in the third band. In some examples, stylus 300 may deactivate all receivers 305 during signal transmission.

In view of the above, the drive signals employed by touch sensor 200 may effect various operating modes of both the touch sensor (e.g., local searching) and stylus 300 (e.g., determination of band proximity, temporal synchronization). With at least a portion of temporal and/or spatial synchronization obtained, stylus 300 may selectively activate and deactivate one or more receivers 305 such that, when proximate to a first touch sensor region (e.g., one or more bands 210) and not proximate to a second touch sensor region (e.g., one or more other bands), the active stylus activates a receiver associated with a first drive signal produced by the first region, and deactivates a receiver associated with a second drive signal produced by the second region. Further, stylus 300 may transmit stylus state information to touch sensor 200 while the region that produced a determined drive signal (e.g., a drive signal produced by a band to which the stylus is proximate) is multiplexed to receive circuitry 206, and may disable signal transmission while one or more other regions of the touch sensor are multiplexed to the receive circuitry. In other examples, stylus 300 may transmit stylus state information to touch sensor 200 while one or more adjacent regions adjacent to the region that produced the determined drive signal are multiplexed to receive circuitry 206. By constraining signal reception and/or transmission to certain touch frame time slots and corresponding bands 210, the power consumed by stylus 300 can be reduced.

Various modifications to the approaches described herein are possible. In one implementation, touch sensor 200 may drive successive sets of two or more regions with a sensing drive signal. For example, touch sensor 200 may successively drive two or more (e.g., adjacent) bands 210 with the sensing drive signal, as opposed to successively driving individual bands. In this approach, the sensing drive signal may drive bands 1 and 2, followed by bands 3 and 4, etc., or the sensing drive signal may drive bands 1 and 2, followed by bands 2 and 3, etc.

In another implementation, stylus 300 may perform selective transmission when proximate to a border region. For example, based on determining that two or more drive signals respectively produced by adjacent regions of touch sensor 200 influenced a received capacitive signal, stylus 300 may identify its location as corresponding to a border between the adjacent regions. In response, stylus 300 may then transmit stylus state information to touch sensor 200 while either of the adjacent regions are multiplexed to receive circuitry 206, and not transmit the stylus state information while a third adjacent region adjacent to one of the adjacent regions is multiplexed to the receive circuitry. In this example, each pair of the two or more drive signals respectively produced by adjacent regions may be substantially orthogonal to each other, to enable adjacent drive signals to be received at stylus 300 with sufficient integrity.

Other touch sensor configurations are possible. For example, touch sensor 200 may be implemented as an in-cell or on-cell touch sensor, or as neither an in-cell nor an on-cell touch sensor but as a discrete touch sensor separate from another device (e.g., display or computing device). Further, other touch sensor types may be employed. For example, stylus 300 may interface as described herein with a touch sensor configured to measure the mutual capacitance between transmit and receive electrodes. The electrodes may be implemented as elongate rows and columns at perpendicular or oblique angles and vertically spaced from one another, meshes, transmit and receive regions (e.g., diamond regions) in a common plane, etc. The mutual capacitance touch sensor may drive (e.g., simultaneously) transmit electrode subsets with subset-specific drive signals and interrupt such driving by sequentially driving the subsets with the sensing drive signal, for example. Further, the mutual capacitance touch sensor may sequentially receive output at receive electrode subsets with multiplexing to receive circuitry or with receive circuitry coupled to each subset. The mutual capacitance touch sensor may perform local searching at an electrode subset where the presence of an active stylus is indicated.

Figure 5:
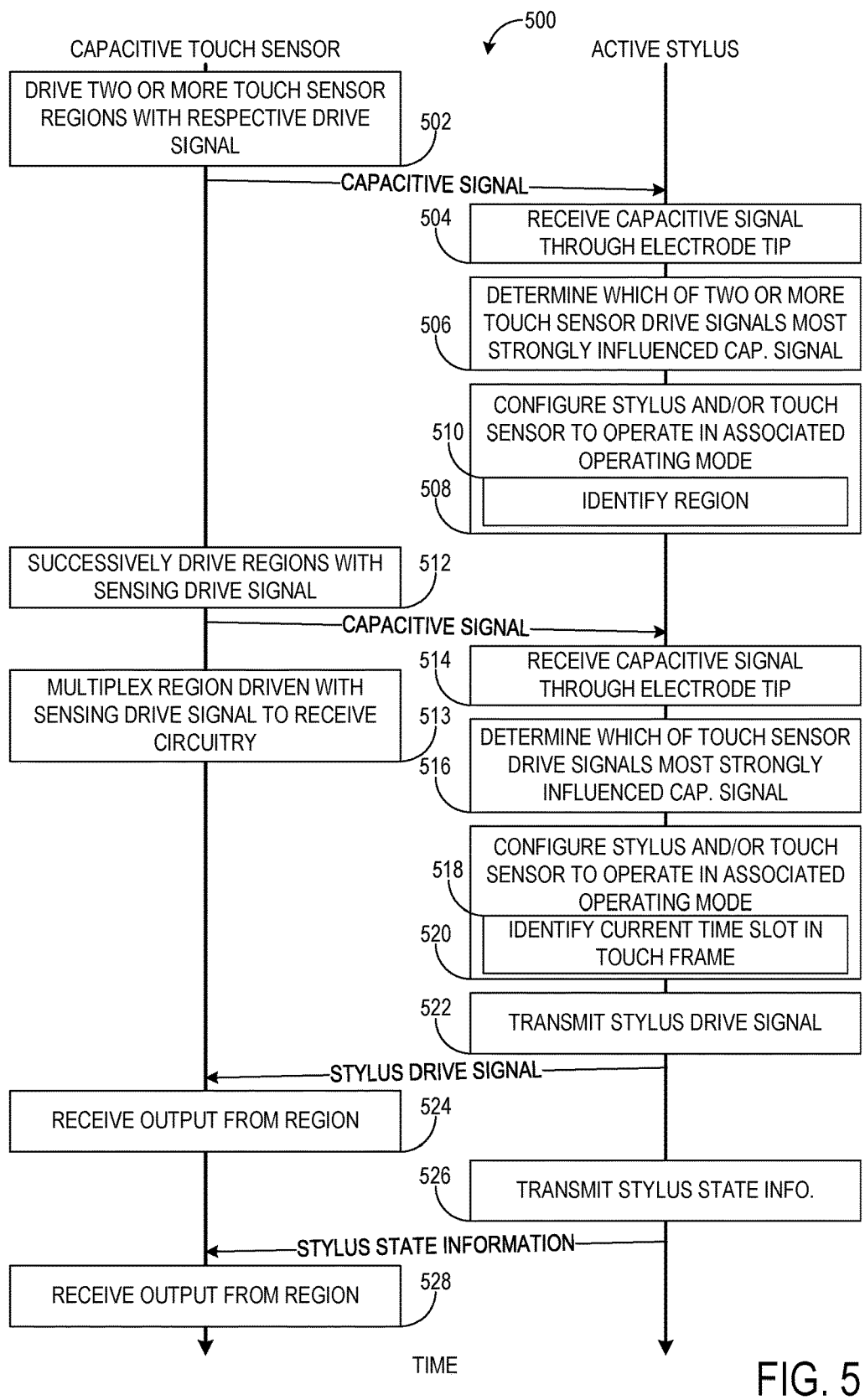
FIG. 5 shows a flowchart illustrating a method of communicating between an active stylus and a capacitive touch sensor.

FIG. 5 shows a flowchart illustrating a method 500 of facilitating communication between an active stylus and a capacitive touch sensor. Aspects of method 500 may be implemented at touch sensor 200 and/or active stylus 300, for example.

At 502, method 500 includes, at the touch sensor, driving each of two or more regions of operation of a plurality of electrodes of the touch sensor with a respective drive signal. For example, the touch sensor may drive two or more electrode bands with respective band-specific drive signals. Each drive signal may be associated with a different operating mode of the touch sensor and/or stylus.

At 504, method 500 includes, at the stylus, receiving a capacitive signal through an electrode tip of the stylus. The capacitive signal may be induced by the driving of the two or more regions with the respective drive signals.

At 506, method 500 includes, at the stylus, determining which of the two or more respective drive signals produced by respective regions of the touch sensor most strongly influenced the capacitive signal. For example, the stylus may correlate the capacitive signal using two or more receivers respectively provided for each drive signal, and determine which receiver produced the highest correlation.

At 508, method 500 includes, at the stylus, configuring one or both of the stylus and the touch sensor to operate in an operating mode associated with the determined drive signal that most strongly influenced the capacitive signal. The operating mode may include, at 510, identifying the touch sensor region that produced the determined drive signal as corresponding to a location of the stylus relative to the touch sensor.

At 512, method 500 includes, at the touch sensor, successively driving the two or more regions with a sensing drive signal. The two or more regions may be successively driven such that driving with the sensing drive signal interrupts driving with the respective drive signals.

At 513, method 500 includes, at the touch sensor, multiplexing the region driven with the sensing drive signal to receive circuitry of the touch sensor. The receive circuitry may receive output induced by the driving with the sensing drive signal.

At 514, method 500 includes, at the stylus, receiving a capacitive signal through an electrode tip of the stylus. The capacitive signal may be primarily induced by the sensing drive signal.

At 516, method 500 includes, at the stylus, determining which of the touch sensor drive signals most strongly influenced the capacitive signal. One or more of the region-specific drive signals may have influenced the capacitive signal, but the stylus may determine that the sensing drive signal most strongly influenced the capacitive signal.

At 518, method 500 includes, at the stylus, configuring one or both of the stylus and the touch sensor to operate in an operating mode associated with the sensing drive signal. The operating mode may include, at 520, identifying a current time slot in a touch frame at which the touch sensor is operating based on the sensing drive signal.

At 522, method 500 includes, at the stylus, transmitting a stylus drive signal to the touch sensor. The stylus drive signal may be a locating signal indicating the x/y location of the stylus relative to the touch sensor. The stylus may transmit the stylus drive signal when it is known, based on the temporal synchronization achieved via the sensing drive signal and the spatial synchronization achieved via the region-specific drive signals, that the region to which it is proximate is multiplexed to the receive circuitry of the touch sensor.

At 524, method 500 includes, at the touch sensor, receiving output from a touch sensor region. The output may be primarily induced by the stylus drive signal and received at the region multiplexed at 513.

At 526, method 500 includes, at the stylus, transmitting stylus state information to the touch sensor. The stylus state information may include stylus identification information, a firmware version, button state, etc.

At 528, method 500 includes, at the touch sensor, receiving output from a touch sensor region. The output may be primarily induced by the stylus state information and received at the region multiplexed at 513. The output may be received during a local search conducted at the multiplexed region and prompted by a preceding full search at the multiplexed region with which the output was received at 524, where the full search revealed the presence of the stylus in the multiplexed region via the stylus drive signal.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
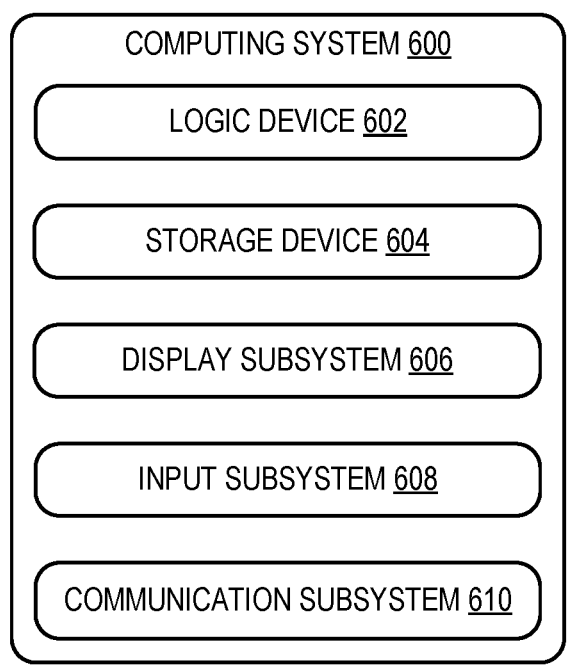
FIG. 6 shows a block diagram of an example computing device.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides an active stylus comprising an electrode tip and receive circuitry coupled to the electrode tip, the receive circuitry being configured to receive a capacitive signal from a touch sensor through the electrode tip, determine which of two or more drive signals produced by respective regions of the touch sensor most strongly influenced the capacitive signal, each drive signal being associated with a different operating mode, and configure one or both of the active stylus and the touch sensor to operate in the operating mode associated with the determined drive signal. In such an example, the receive circuitry alternatively or additionally may be configured to identify the region that produced the determined drive signal as corresponding to a location of the active stylus relative to the touch sensor. In such an example, the receive circuitry alternatively or additionally may be configured to receive a capacitive signal most strongly influenced by a sensing drive signal produced by the region, and to identify a current time slot in a touch frame at which the touch sensor is operating based on the sensing drive signal. In such an example, the operating mode alternatively or additionally may include transmitting from the electrode tip to the touch sensor while the region that produced the determined drive signal is multiplexed to receive circuitry of the touch sensor, and disabling such transmission while one or more other regions of the touch sensor are multiplexed to the receive circuitry. In such an example, the operating mode alternatively or additionally may include transmitting from the electrode tip to the touch sensor while one or more adjacent regions adjacent to the region that produced the determined drive signal are multiplexed to the receive circuitry. In such an example, the receive circuitry alternatively or additionally may be configured to, based on determining that two of the two or more drive signals respectively produced by adjacent regions of the touch sensor influenced the capacitive signal, identify a location of the active stylus as corresponding to a border between the adjacent regions, and transmit from the electrode tip to the touch sensor while either of the adjacent regions are multiplexed to the receive circuitry, and not engage in such transmission while a third adjacent region adjacent to one of the adjacent regions is multiplexed to the receive circuitry. In such an example, while the transmission is disabled, the receive circuitry alternatively or additionally may be configured to listen for one or more additional capacitive signals used to maintain a synchronization between the active stylus and the touch sensor. In such an example, each pair of the two or more drive signals respectively produced by adjacent regions alternatively or additionally may be substantially orthogonal to each other. In such an example, the receive circuitry alternatively or additionally may include a receiver for each of the two or more drive signals, and the receive circuitry alternatively or additionally may be configured to selectively activate and deactivate each receiver such that, when proximate to a first region and not proximate to a second region, the active stylus activates a receiver associated with a first drive signal produced by the first region, and deactivates a receiver associated with a second drive signal produced by the second region.

Another example provides a capacitive touch sensor comprising a plurality of electrodes including two or more regions of operation, drive circuitry configured to drive each of the two or more regions with a respective drive signal, and receive circuitry configured to receive an output from the two or more regions, where each drive signal, when received by an active stylus, causes the active stylus to operate in a different operating mode associated with the drive signal. In such an example, the drive circuitry alternatively or additionally may be configured to successively drive the two or more regions with a sensing drive signal, such that driving with the sensing drive signal interrupts driving with the respective drive signals. In such an example, the sensing drive signal alternatively or additionally may be configured to enable the active stylus to become temporally synchronized with touch frames used by the touch sensor. In such an example, while driving one of the two or more regions with the sensing drive signal, the drive circuitry alternatively or additionally may be configured to multiplex the region to the receive circuitry to receive input sensed by the region. In such an example, the input alternatively or additionally may include a stylus drive signal transmitted by the active stylus indicating a location of the active stylus relative to the touch sensor. In such an example, the input alternatively or additionally may include stylus state information transmitted by the active stylus. In such an example, the output alternatively or additionally may be induced by the driving of the two or more regions with the sensing drive signal. In such an example, the drive circuitry alternatively or additionally may be configured to successively drive sets of the two or more regions with the sensing drive signal. In such an example, in the operating mode associated with each drive signal, the active stylus alternatively or additionally may identify the region that produced the drive signal as corresponding to a location of the active stylus relative to the touch sensor.

Another example provides an interactive touch-sensitive display system comprising a display, a capacitive touch sensor including a plurality of electrodes including two or more regions of operation, drive circuitry configured to drive each of the two or more regions with a respective drive signal, and sensor-side receive circuitry configured to receive an output from the two or more regions, an active stylus including an electrode tip and stylus-side receive circuitry coupled to the electrode tip, the stylus receive circuitry configured to receive a capacitive signal from the touch sensor through the electrode tip, determine which of the drive signals most strongly influenced the capacitive signal, each drive signal being associated with a different operating mode, and configure one or both of the active stylus and the touch sensor to operate in the operating mode associated with the determined drive signal. In such an example, the drive circuitry alternatively or additionally may be configured to drive at least one of the two or more regions with a sensing drive signal, and the stylus-side receive circuitry alternatively or additionally may be configured to spatially and temporally synchronize with the touch sensor based on the sensing drive signal and at least one of the respective drive signals.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An active stylus, comprising:
an electrode tip; and
receive circuitry coupled to the electrode tip, the receive circuitry being configured to:
  receive a capacitive signal from a touch sensor through the electrode tip;
  determine which of two or more different drive signals produced by respective regions of the touch sensor most strongly influenced the capacitive signal, each drive signal being associated with a different operating mode; and
  configure one or both of the active stylus and the touch sensor to operate in the operating mode associated with the determined drive signal, the operating mode including transmitting from the electrode tip to the touch sensor while the region that produced the determined drive signal is multiplexed to receive circuitry of the touch sensor, and disabling such transmission from the electrode tip to the touch sensor while one or more other regions of the touch sensor are multiplexed to the receive circuitry.

2. The active stylus of claim 1, where the receive circuitry is further configured to identify the region that produced the determined drive signal as corresponding to a location of the active stylus relative to the touch sensor.

3. The active stylus of claim 1, where the receive circuitry is further configured to receive a capacitive signal most strongly influenced by a sensing drive signal produced by the region, and to identify a current time slot in a touch frame at which the touch sensor is operating based on the sensing drive signal.

4. The active stylus of claim 1, where the operating mode further includes transmitting from the electrode tip to the touch sensor while one or more adjacent regions adjacent to the region that produced the determined drive signal are multiplexed to the receive circuitry.

5. The active stylus of claim 1, where the receive circuitry is further configured to:
based on determining that two of the two or more different drive signals respectively produced by adjacent regions of the touch sensor influenced the capacitive signal, identify a location of the active stylus as corresponding to a border between the adjacent regions; and
transmit from the electrode tip to the touch sensor while either of the adjacent regions are multiplexed to the receive circuitry, and not engage in such transmission while a third adjacent region adjacent to one of the adjacent regions is multiplexed to the receive circuitry.

6. The active stylus of claim 1, where, while the transmission is disabled, the receive circuitry is further configured to listen for one or more additional capacitive signals used to maintain a synchronization between the active stylus and the touch sensor.

7. The active stylus of claim 1, where each pair of the two or more different drive signals respectively produced by adjacent regions is substantially orthogonal to each other.

8. The active stylus of claim 1, where the receive circuitry includes a receiver for each of the two or more different drive signals, and where the receive circuitry is further configured to selectively activate and deactivate each receiver such that, when proximate to a first region and not proximate to a second region, the active stylus activates a receiver associated with a first drive signal produced by the first region, and deactivates a receiver associated with a second drive signal produced by the second region.

9. A capacitive touch sensor, comprising:
a plurality of electrodes including two or more regions of operation;
drive circuitry configured to drive each of the two or more regions with a respectively different drive signal; and
receive circuitry configured to receive an output from the two or more regions, where a determined drive signal, when received by an active stylus, causes the active stylus to operate in an operating mode associated with the determined drive signal, and where the operating mode includes transmitting from an electrode tip of the active stylus to the touch sensor while the region that produced the determined drive signal is multiplexed to the receive circuitry, and disabling such transmission from the electrode tip to the touch sensor while one or more other regions of the touch sensor are multiplexed to the receive circuitry.

10. The capacitive touch sensor of claim 9, where the drive circuitry is further configured to successively drive the two or more regions with a sensing drive signal, such that driving with the sensing drive signal interrupts driving with the respective drive signals.

11. The capacitive touch sensor of claim 10, where the sensing drive signal is configured to enable the active stylus to become temporally synchronized with touch frames used by the touch sensor.

12. The capacitive touch sensor of claim 10, where, while driving one of the two or more regions with the sensing drive signal, the drive circuitry is further configured to multiplex the region to the receive circuitry to receive input sensed by the region.

13. The capacitive touch sensor of claim 12, where the input includes a stylus drive signal transmitted by the active stylus indicating a location of the active stylus relative to the touch sensor.

14. The capacitive touch sensor of claim 12, where the input includes stylus state information transmitted by the active stylus.

15. The capacitive touch sensor of claim 10, where the output is induced by the driving of the two or more regions with the sensing drive signal.

16. The capacitive touch sensor of claim 9, where the drive circuitry is further configured to successively drive sets of the two or more regions with the sensing drive signal.

17. The capacitive touch sensor of claim 9, where, in the operating mode, the active stylus identifies the region that produced the determined drive signal as corresponding to a location of the active stylus relative to the touch sensor.

18. An interactive touch-sensitive display system, comprising:
a display;
a capacitive touch sensor including:
a plurality of electrodes including two or more regions of operation;
drive circuitry configured to drive each of the two or more regions with a respectively different drive signal; and
sensor-side receive circuitry configured to receive an output from the two or more regions;
an active stylus including an electrode tip and stylus-side receive circuitry coupled to the electrode tip, the stylus receive circuitry configured to:
receive a capacitive signal from the touch sensor through the electrode tip;
determine which of the drive signals most strongly influenced the capacitive signal, each drive signal being associated with a different operating mode; and
configure one or both of the active stylus and the touch sensor to operate in the operating mode associated with the determined drive signal, the operating mode including transmitting from the electrode tip to the touch sensor while the region that produced the determined drive signal is multiplexed to the sensor-side receive circuitry, and disabling such transmission from the electrode tip to the touch sensor while one or more other regions of the touch sensor are multiplexed to the sensor-side receive circuitry.

19. The interactive touch-sensitive display system of claim 18, where the drive circuitry is further configured to drive at least one of the two or more regions with a sensing drive signal, and where the stylus-side receive circuitry is further configured to spatially and temporally synchronize with the touch sensor based on the sensing drive signal and at least one of the respective drive signals.

* * * * *